United States Patent [19]

Gaskell

[11] Patent Number: 5,092,039
[45] Date of Patent: Mar. 3, 1992

[54] METHOD OF MAKING FUEL INJECTORS FOR INTERNAL COMBUSTION ENGINES

[75] Inventor: David J. Gaskell, Sudbury, England

[73] Assignee: Lucas Industries public limited company, England

[21] Appl. No.: 670,028

[22] Filed: Mar. 15, 1991

Related U.S. Application Data

[62] Division of Ser. No. 376,237, Jul. 6, 1989, Pat. No. 5,016,820.

[30] Foreign Application Priority Data

Jan. 26, 1988 [GB] United Kingdom ............... 8817774

[51] Int. Cl.$^5$ .............................................. B23P 15/62
[52] U.S. Cl. ........................... 29/890.142; 239/533.12; 239/601
[58] Field of Search .................... 29/890.142, 890.143; 239/533.2–533.12, 601; 219/69.17

[56] References Cited

U.S. PATENT DOCUMENTS

| | | | |
|---|---|---|---|
| 2,618,989 | 11/1952 | Cupen, II | 29/890.142 |
| 3,591,907 | 7/1971 | MacMunn | 239/533.2 |
| 4,360,162 | 11/1982 | Eckert | 239/533.4 |
| 4,506,833 | 3/1985 | Yoneda et al. | 239/533.4 |
| 4,646,974 | 3/1987 | Sofeinek et al. | 239/533.12 |
| 4,745,670 | 5/1988 | Morris | 29/890.142 |
| 4,758,169 | 7/1988 | Steiger | 239/533.8 |
| 4,790,055 | 12/1988 | Raufusen et al. | 29/890.142 |
| 4,801,095 | 1/1989 | Barghaf et al. | 29/890.12 |

FOREIGN PATENT DOCUMENTS

| | | | |
|---|---|---|---|
| 994588 | 11/1951 | France | 239/533.5 |
| 0065217 | 5/1979 | Japan | 29/890.142 |
| 0080066 | 4/1988 | Japan | 239/533.5 |
| 400836 | 11/1933 | United Kingdom | 239/533.12 |
| 408186 | 4/1934 | United Kingdom | 239/533.9 |
| 667463 | 3/1952 | United Kingdom | 239/533.12 |

Primary Examiner—Irene Cuda
Attorney, Agent, or Firm—Laff, Whitesel, Conte & Saret

[57] ABSTRACT

In a multi-hole fuel injector of the VCO type the holes are larger at their inner ends than their outer ends, i.e. they taper in some way, to achieve a bushy spray without making the wall of the nozzle too thin. They can best be formed by electro-erosion machining.

4 Claims, 1 Drawing Sheet

METHOD OF MAKING FUEL INJECTORS FOR INTERNAL COMBUSTION ENGINES

This application is a division of prior application Ser. No. 07/376,237, filed 7/6/89, now U.S. Pat. No. 5,016,820.

This invention relates to fuel injectors for internal combustion engines, and in particular to the design of the nozzles of multi-hole injectors.

The overall design of fuel injectors has remained constant over many years but there have been a number of detail improvements in the search for improved spray patterns, and to suit different combustion chambers. The tip of the nozzle of the normal multi-hole injector is of roughly hemispherical shape with two, three, four or more radially directed drilled holes of constant cross-section. On completion of the injection process there is still an appreciable quantity of fuel left inside the tip of the nozzle, known as the sac, and in the holes themselves, and this fuel, emerging subsequently during the cycle when the pressure in the cylinder has fallen, is not burnt or is only partially burnt and finds its way into the exhaust gases, with a consequent adverse effect on emission quality. Accordingly, in the interests of emission control, in particular in keeping down HC emissions, efforts have been made to reduce the volume of the sac by making it internally partially conical so that the tip of the needle largely fills it, or in the so-called VCO nozzle by moving the positions of the holes from the sac to the conical part of the wall so that the needle covers their inner ends and the sac is not only small but is anyway cut-off from the spray holes when the valve is closed.

An example of a VCO nozzle is described in U.S. Pat. No. 4,506,833.

The spray pattern is dependent on the ratio of the diameter to the length of the hole; a short hole will result in a bushy spray of lower penetration than a longer hole of the same diameter. The degree of penetration required is, however, dictated by the shape and size of the combustion chamber in which the injector is to be used. To achieve a bushy spray one can shorten the holes by reducing the wall thickness of the nozzle but there is a strict limit to how far this can be carried in the case of VCO nozzles, on grounds of strength; with the high injection pressures involved, there is a danger of the tip of the nozzle being blown off if it is of inadequate strength. In practice the wall thickness must be 1 mm or at the very least 0.8 mm.

In VCO nozzles it has been proposed in the past to countersink the outer ends of the holes with a view reducing their length for a given wall thickness but this was not adopted as it was found that carbon deposits soon built up in the countersink.

The primary aim of the invention, therefore, is to allow a given design of VCO injector, i.e. one with a nozzle of a given wall thickness, to be produced with varying penetration qualities according to requirements, and in particular to allow the effective length of the holes to be reduced (i.e. for bushier spray patterns) without weakening the nozzle unacceptably.

According to the invention these results are achieved by machining the holes in the nozzle to have a larger cross-section at the inner end than at the outer end.

For example the hole could be of simple convergent tapering form. Alternatively it could be stepped, with the inner part of one diameter and the outer part of a smaller diameter; it is largely only the small-diameter outer part that determines the penetration and density of the spray plume and so by varying the length of this part one can obtain the desired pattern without affecting the strength of the nozzle.

Bearing in mind the very small diameter (of the order of 0.2 mm) of the holes the most practical way of forming them is by electro-erosion machining.

Some examples of nozzles of fuel injectors are illustrated in the accompanying drawing, in which.

Figure 1:
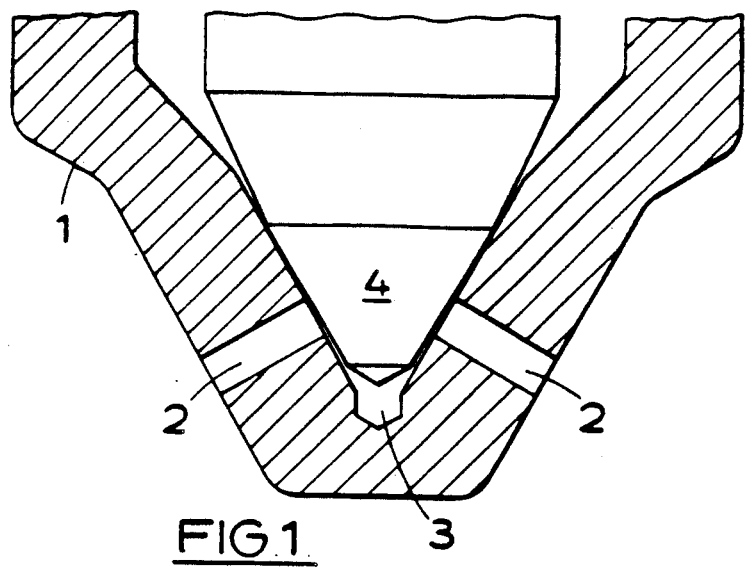
FIG. 1 shows a typical VCO injector to which the invention may be applied.

In FIG. 1 is illustrated the lower end of a typical VCO injector. The injector body 1 terminates in a conical tip having a number, usually at least three, of circumferentially spaced inclined spray holes 2 through which the fuel is sprayed under high pressure into the cylinder of an internal combustion engine in which it is mounted. The lower end of the body defines a sac 3 but in contrast to the layout in earlier forms of nozzle, the VCO nozzle has the inner ends of the holes opening not into the sac but into a conical portion of the inner wall of the body which is engaged by the conical tip 4 of the valve. Hence the name VCO, which stands for Valve Covered Orifice. The taper on the tip of the valve may differ very slightly from that of the internal surface of the body.

As explained above, for reasons of strength, one cannot, with present technology, reduce the thickness of the wall of the injector body in this region below 0.8 mm at the very minimum. A hole of this length and of a typical diameter of the order of 0.2 mm will produce a plume of fuel of substantial penetration, more than may be desirable for a given set of engine requirements.

Figure 2:
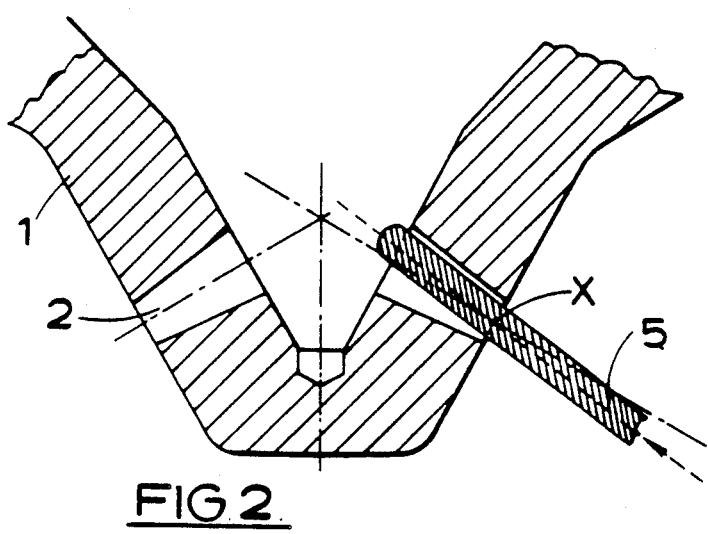
FIG. 2 shows a nozzle with tapered holes.
Figure 3:
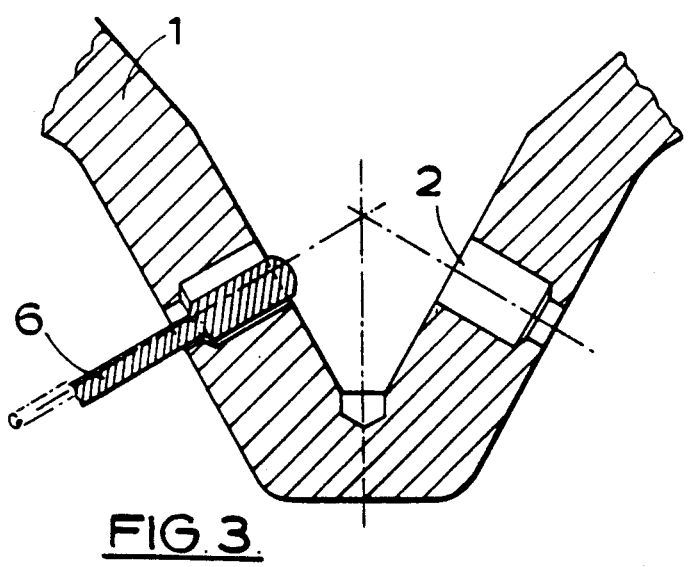
FIG. 3 shows a nozzle with stepped holes.

Accordingly, as shown in FIG. 2 and 3, we shape the holes to have a larger cross-section at the inner end then at the outer end, and we find that this achieves the effect of a shorter hole, yet without weakening the wall of the injector body.

To form the tapered holes shown in FIG. 2 the hole is first made through the wall of the nozzle by the known technique of electro-erosion using an electro-machining electrode in the form of a wire 5; the wire is then tilted at an angle to the axis of the initial hole and rotated about that axis, precessing about the point X, and the angle being increased as necessary to produce the required taper. It would in theory be possible to form the initial hole by another method, for example using a twist drill, but then the alignment of the electrode with the hole to the necessary high degree of precision presents problems.

To form the stepped holes shown in FIG. 3, again a hole 2 is first formed by the known method of electro-erosion, but the electrode used is of the shape shown at 6, its head being a cylinder of the diameter of the initial hole and its shank being of smaller diameter. After the initial hole of uniform diameter has been formed the electrode 6, inserted to the required depth, is then moved in an orbit of the required diameter to open out the inner end of the hole. It will be apparent that the axial position of the electrode 6 during this orbital movement will determine how much of the hole 2 remains of the original diameter and how much is enlarged.

Other methods of forming the holes may be found. Also the profile could be different from the two examples shown. What is important is that they are larger at the inner end than the outer end, so as to reduce the effective length to control the spray pattern without reducing the wall thickness of the nozzle.

I claim:

1. A method of forming a nozzle of a valve-covered orifice fuel injector comprising taking a nozzle having a nozzle wall but no fuel delivery holes and forming a delivery hole in said wall from outside said nozzle by (a) introducing a hole-former through said wall of said nozzle; (b) angling said hole-former with respect to the axis of said hole; and (c) precessing said hole-former about said axis to describe a conical path about said axis to form a uniformly convergent conical delivery hole in said nozzle.

2. A method according to claim 1 wherein said hole-former is an electrode and said delivery hole is electro-eroded in said nozzle.

3. A method of forming a nozzle of a valve-covered orifice fuel injector comprising taking a nozzle having a nozzle wall but no fuel delivery holes and forming a delivery hole in said wall from outside said nozzle by using a hole-former having a shank and a head of larger diameter than said shank connected to said shank at a shoulder region, said method comprising (a) forming an initial hole through said wall with said head of said hole-former, said initial hole being of the same diameter as said head; (b) positioning said hole-former so that said shoulder region is at an intermediate position in the thickness of said wall; and (c) moving said hole-former in an orbit to cause said hole having an outer portion of relatively narrow diameter and an inner portion of larger diameter, the spray distribution characteristics of said hole being determined in part by the positioning of said shoulder region in step (b) which determines the axial length of said narrow diameter outer region of said hole.

4. A method according to claim 1 wherein said hole-former is an electrode and said delivery hole is electro-eroded in said nozzle.

* * * * *

UNITED STATES PATENT AND TRADEMARK OFFICE
CERTIFICATE OF CORRECTION

PATENT NO.   :   5,092,039
DATED        :   March 3, 1992
INVENTOR(S)  :   David J. Gaskell It is certified that error appears in the above-identified patent and that said Letters Patent is hereby corrected as shown below:

On the title page
  Item [30] Foreign Application Priority Data is incorrect:

"Jan. 26, 1988 [GB]   United Kingdom....8817774"

should be corrected to

--July 26, 1988 [GB]   United Kingdom....8817774--

Signed and Sealed this

Fifth Day of October, 1993

Attest:

BRUCE LEHMAN

Attesting Officer          Commissioner of Patents and Trademarks